(12) United States Patent
Bailey et al.

(10) Patent No.: US 6,981,180 B1
(45) Date of Patent: Dec. 27, 2005

(54) METHOD AND APPARATUS FOR TESTING REQUEST-RESPONSE SERVICE USING LIVE CONNECTION TRAFFIC

(75) Inventors: Shannon T. Bailey, San Francisco, CA (US); Ross Cohen, San Rafael, CA (US); Daniel Stodolsky, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 09/810,982

(22) Filed: Mar. 16, 2001

Related U.S. Application Data

(60) Provisional application No. 60/189,734, filed on Mar. 16, 2000.

(51) Int. Cl.[7] .............................................. G06F 11/00
(52) U.S. Cl. ....................................... 714/38; 717/124
(58) Field of Search .............................. 714/38, 39, 43, 714/45, 37, 18, 47, 48, 31; 709/206, 105, 709/224, 219, 230, 231; 717/124, 126, 127, 717/171

(56) References Cited

U.S. PATENT DOCUMENTS

| | | | | |
|---|---|---|---|---|
| 5,958,015 A | * | 9/1999 | Dascalu ........................ 709/229 |
| 5,974,572 A | * | 10/1999 | Weinberg et al. ............... 714/47 |
| 6,003,030 A | * | 12/1999 | Kenner et al. .................. 707/10 |
| 6,154,744 A | * | 11/2000 | Kenner et al. .................. 707/10 |
| 6,421,726 B1 | * | 7/2002 | Kenner et al. ................ 709/225 |
| 6,549,944 B1 | * | 4/2003 | Weinberg et al. ............ 709/224 |
| 6,694,288 B2 | * | 2/2004 | Smocha et al. .............. 702/186 |
| 6,785,704 B1 | * | 8/2004 | McCanne ..................... 718/105 |

\* cited by examiner

Primary Examiner—Nadeem Iqbal
(74) Attorney, Agent, or Firm—David H. Judson

(57) ABSTRACT

The present invention provides for a method and apparatus for comparison of network systems using live traffic in real-time. The inventive technique presents real-world workload in real-time with no external impact (i.e. no impact on the system under test), and it enables comparison against a production system for correctness verification. A preferred embodiment of the invention is a testing tool for the pseudo-live testing of CDN content staging servers, According to the invention, traffic between clients and the live production CDN servers is monitored by a simulator device, which then replicates this workload onto a system under test (SUT). The simulator detects divergences between the outputs from the SUT and live production servers, allowing detection of erroneous behavior. To the extent possible, the SUT is completely isolated from the outside world so that errors or crashes by this system do not affect either the CDN customers or the end users. Thus, the SUT does not interact with end users (i.e., their web browsers). Consequently, the simulator serves as a proxy for the clients. By basing its behavior off the packet stream sent between client and the live production system, the simulator can simulate most of the oddities of real-world client behavior, including mal-formed packets, timeouts, dropped traffic and reset connections, among others.

16 Claims, 6 Drawing Sheets

Client-PG conversation
35.307723 client.2894 > PG.80: S 649812829:649812829(0) win 8192 id 37968
 <mss 536>
35.307807 PG.80 > client.2894: S 2103996938:2103996938(0) ack 649812830
 win 32736 id 22893 <mss 536>
35.394877 client.2894 > PG.80: . ack 1 win 8576 id 37989
35.402592 client.2894 > PG.80: P 1:405(404) ack 1 win 8576 id 37991
35.404046 PG.80 > client.2894: P 1:160(159) ack 405 win 32736 id 22902
35.404327 PG.80 > client.2894: F 160:160(0) ack 405 win 32736 id 22903
35.499080 client.2894 > PG.80: . ack 161 win 8417 id 38023
35.598546 client.2894 > PG.80: F 405:405(0) ack 161 win 8576 id 38049
35.598617 PG.80 > client.2894: . ack 406 win 32735 id 22925

FIG. 9
```
35.307723 client.2894 > PG.80: S 649812829:649812829(0) win 8192 id 37968
    <mss 536>
EWS duplicates client open
35.307864 client.2894 > IG.80: S 649812829:649812829(0) win 8192 id 37968
    <mss 536> (ews)
35.307807 PG.80 > client.2894: S 2103996938:2103996938(0) ack 649812830
    win 32736 id 22893 <mss 536>
Invisible Ghost responds to open
35.308005 IG.80 > client.2894: S 1396028487:1396028487(0) ack 649812830
    win 32736 id 44202 <mss 536>
```

FIG. 10
```
35.394877 client.2894 > PG.80: . ack 1 win 8576 id 37989
EWS duplicates client first ack, adjusting sequence numbers
35.394940 client.2894 > IG.80: . ack 1 win 8576 id 3750 (ews)
35.402592 client.2894 > PG.80: P 1:405(404) ack 1 win 8576 id 37991
EWS duplicates client request
35.402723 client.2894 > IG.80: P 1:405(404) ack 1 win 8576 id 37991 (ews)
```

FIG. 11
```
Invisible Ghost responds with 196 bytes
35.404068 IG.80 > client.2894: P 1:197(196) ack 405 win 32736 id 44209
Production Ghost with 159 bytes
35.404046 PG.80 > client.2894: P 1:160(159) ack 405 win 32736 id 22902
PG closes connection
35.404327 PG.80 > client.2894: F 160:160(0) ack 405 win 32736 id 22903
IG closes connection
35.404457 IG.80 > client.2894: F 197:197(0) ack 405 win 32736 id 44210
```

FIG. 12
```
Client acknowledges data & FIN
35.499080 client.2894 > PG.80: . ack 161 win 8417 id 38023
EWS ack's data (rounding to packet boundary)
35.499146 client.2894 > IG.80: . ack 197 win 8381 id 3776 (ews)
EWS ack's FIN (blowing window open for drain)
35.540786 client.2894 > IG.80: . ack 198 win 65533 id 3778 (ews)
```

FIG. 13
```
35.598546 client.2894 > PG.80: F 405:405(0) ack 161 win 8576 id 38049
35.598604 client.2894 > IG:80: F 405:405(0) ack 198 win 8576 id 38049 (ews)
35.598617 PG.80 > client.2894: . ack 406 win 32735 id 22925
35.598754 IG.80 > client.2894: . ack 406 win 32735 if 44216
```

[temp start Wed Jan 12 04:44:14 2000 ]|
[es (35.168.66.2.1283) headers (request 1)]
GET /7/1508/993//382b7678/www.looksmart.com/i/1s99/1s-cuts.gif HTTP/1.0
Accept: */*
Referer: http://www.looksmart.com/cus1/cus65300/cus65303/cus77824/cus65079/cus327765/cus327766/cus318905/cus318610/r1&
Accept-Language: en-us
Accept-Encoding: grip.deflate
User-Agent: Mogilla/4.0 (computiNe, MSIE 4.01; Windows 95)
Host: a1508 g.akamaitech.net
[pg (38.187.87.201.80) headers (1) total_bytes: 1982 body_bytes: 1735]
HTTP/1.0 200 OK
Date: Fri, 12 Nov 1999 01:57:01 GMT
Server: Apache/1.3.4 (Unix)
Last-Modified: Mon, 09 Aug 1999 22:03:59 GMT
ETag: "u9c71.6c7.37af504f"
Accept-Ranges: bytes
Content-Length: 1735
Content-Type: image/gif
Connection: close
[ig (38.185.125.201.80) headers (1) total_bytes: 1903 body_bytes: 1656]
HTTP/1.0 200 OK
DATE: Wed, 12 Jan 2000 02:15:14 GMT
Server: Apache/1.3.4 (Unix)
Last-Modified: Wed, 11 Aug 1999 20:02:14 GMT
ETag: "7a939-673-37b1d6c6"
Accept-Ranges: bytes
Content-Length: 1656
Content-Type: images/gif
Connection: close
[msg] Differing response lengths
(temp end]|

*FIG. 14*

METHOD AND APPARATUS FOR TESTING REQUEST-RESPONSE SERVICE USING LIVE CONNECTION TRAFFIC

This application is based on Provisional Application Ser. No. 60/189,734, filed Mar. 16, 2000.

This application includes subject matter that is protected by Copyright Law. All rights reserved.

BACKGROUND OF THE INVENTION

1. Technical Field

The present invention relates generally to testing a request-response service using live connection traffic. One such request-response service involves high-performance, fault-tolerant HTTP, streaming media and applications delivery over a content delivery network (CDN).

2. Description of the Related Art

It is well-known to deliver HTTP and streaming media using a content delivery network (CDN). A CDN is a self-organizing network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server. An entity that provides a CDN is sometimes referred to as a content delivery network service provider or CDNSP.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

CDNSPs may use content modification to tag content provider content for delivery. Content modification enables a content provider to take direct control over request-routing without the need for specific switching devices or directory services between the requesting clients and the origin server. Typically, content objects are made up of a basic structure that includes references to additional, embedded content objects. Most web pages, for example, consist of an HTML document that contains plain text together with some embedded objects, such as .gif or .jpg images. The embedded objects are referenced using embedded HTML directives. A similar scheme is used for some types of streaming content which, for example, may be embedded within an SMIL document. Embedded HTML or SMIL directives tell the client to fetch embedded objects from the origin server. Using a CDN content modification scheme, a content provider can modify references to embedded objects so that the client is told to fetch an embedded object from the best surrogate (instead of from the origin server).

In operation, when a client makes a request for an object that is being served from the CDN, an optimal or "best" edge-based content server is identified. The client browser then makes a request for the content from that server. When the requested object is not available from the identified server, the object may be retrieved from another CDN content server or, failing that, from the origin server.

A well-managed content delivery network implements frequent upgrades to its production software, e.g., the software used to provide HTTP content delivery from its edge-based content servers. Thus, for example, as new content or "edge" server functionalities are added to the network, they need to be tested, debugged, rewritten and, ultimately, deployed into production across the network as a whole. An ongoing challenge is testing such new software is the inability to reproduce real-world workload on new versions of the software short of deploying them in the field. While testing a CDN server with real-world traffic (a "live load test") would be desirable, it has not been possible to do so without having the CDN server interact with the outside world. This interaction may cause significant problems if the version under live test has bugs or otherwise interferes with conventional server functions. Additionally, when field-deployment is used, there is no convenient mechanism for checking if a new version of the software under test produces equivalent output to the old version, namely, the production version.

Generally, there are a number of known approaches to testing software. Regression testing refers to the technique of constructing test cases and executing the software against those cases. Regression testing, while effective in avoiding repeat of bugs, is labor-intensive and thus costly. Stress or "load" testing refers to the technique of simulating the working environment of the software using a testbed or equivalent architecture. While stress/load testing is useful in evaluating system limits, finding representative workloads to use for the test is always difficult. Trace-based testing refers to the technique of playing back to the software under test a trace of activity obtained from a production version. This technique, although generally useful, may lead to inaccurate conclusions as, in some applications (like a CDN caching server), traces go stale very quickly and/or do not include information that might be needed to evaluate the new version effectively. Field-deployment testing, as its name suggests, refers to the technique of testing a version of the software with a real-world workload. As noted above, when field-deployment is used, there is no convenient way of isolating the software under test from interacting with real users and customers, and there is no mechanism for checking if a new version of the software under test produces equivalent output to the old version, namely, the production version. Error detection is hard, and debugging is difficult because there is limited information capture and the developer is often unable to deploy instrumented code. In addition, during live field-testing, the developer is not able to destructively test the code, i.e., to make the software less robust (e.g., letting it crash) in the face of problems instead of patching over them, in order to assist in tracking down problems.

It would be desirable to be able to provide a way to test IP-networking-based servers (either software, hardware, or some combination thereof) with live traffic and to compare the results of these tests with currently running CDN traffic. Such a method also could be used to test network-based servers before their actual deployment. The present invention addresses this need in the art.

BRIEF SUMMARY OF THE INVENTION

The present invention provides for a method and apparatus for comparison of network systems using live traffic in real-time. The inventive technique presents real-world workload in real-time with no external impact (i.e. no impact on customers of the service, nor the system providing the service), and it enables comparison against a production system for correctness verification.

A preferred embodiment of the invention is a testing tool for the pseudo-live testing of CDN content staging servers, although this is not a limitation of the invention. When deployed, production content staging servers (also referred to as reverse proxies or surrogate origin servers) sit behind a switch providing connectivity to the Internet. These switches often have a port-monitoring feature, used for management and monitoring, which allows all traffic going through the switch to be seen on the configured port. According to the invention, traffic between clients and the live production CDN servers is monitored by a simulator device, which replicates this workload onto a system under test (SUT). The simulator provides high-fidelity duplication (ideally down to the ethernet frame level), while also compensating for differences in the output between the system under test and the live production system. Additionally, the simulator detects divergences between the outputs from the SUT and live production servers, allowing detection of erroneous behavior. To the extent possible, the SUT is completely isolated from the outside world so that errors or crashes by this system do not affect either the CDN customers or the end users. Thus, the SUT does not interact with end users (i.e., their web browsers). Consequently, the simulator serves as a proxy for the clients. By basing its behavior off the packet stream sent between client and the live production system, the simulator can simulate most of the oddities of real-world client behavior, including malformed packets, timeouts, dropped traffic and reset connections, among others.

In a preferred embodiment, the main functionality of the tool is provided by an External World Simulator (EWS). The EWS listens promiscuously on a CDN region switch interface, rewrites incoming client packets bound for a production server to be routed to a beta server being tested, optionally compares the content and headers of the beta reply to the production reply, and black-holes (i.e. terminates) the client bound traffic from the beta server. A primary advantage this tool provides is the ability to put servers of an unknown quality into a live environment and to receive notification if the client experience differs from a known standard (as provided by the production servers).

The simulator may provide varying degrees of validation. Thus, for example, the simulator may provide substantially limited validation that suffices for testing new versions for crashes and long-term memory leaks. The simulator may test for "identical" output, wherein the output of the system under test is checked for byte-for-byte equality with the production system. The simulator may also check for "equivalent" output, wherein the output of the SUT and the production system are checked for logical equivalence (isomorphism). This type of validation typically involves use of specific application-level logic. The particular equivalence checking logic will depend on the functionalities being implemented, of course.

The foregoing has outlined some of the more pertinent features and technical advantages of the present invention. These features and advantages should be construed to be merely illustrative. Many other beneficial results can be attained by applying the disclosed invention in a different manner or by modifying the invention as will be described. Accordingly, other features and a fuller understanding of the invention may be had by referring to the following Detailed Description of the Preferred Embodiment.

BRIEF DESCRIPTION OF THE DRAWINGS

FIGS. 6–7 are state diagrams illustrating how the EWS manages (opens and closes) connections between the production ghost(s) and the invisible ghost(s) according to the preferred embodiment; and FIGS. 8–14 illustrate the operation of the EWS for a given connection between a requesting client and a production server.

DESCRIPTION OF THE PREFERRED EMBODIMENT OF THE INVENTION

Figure 1:
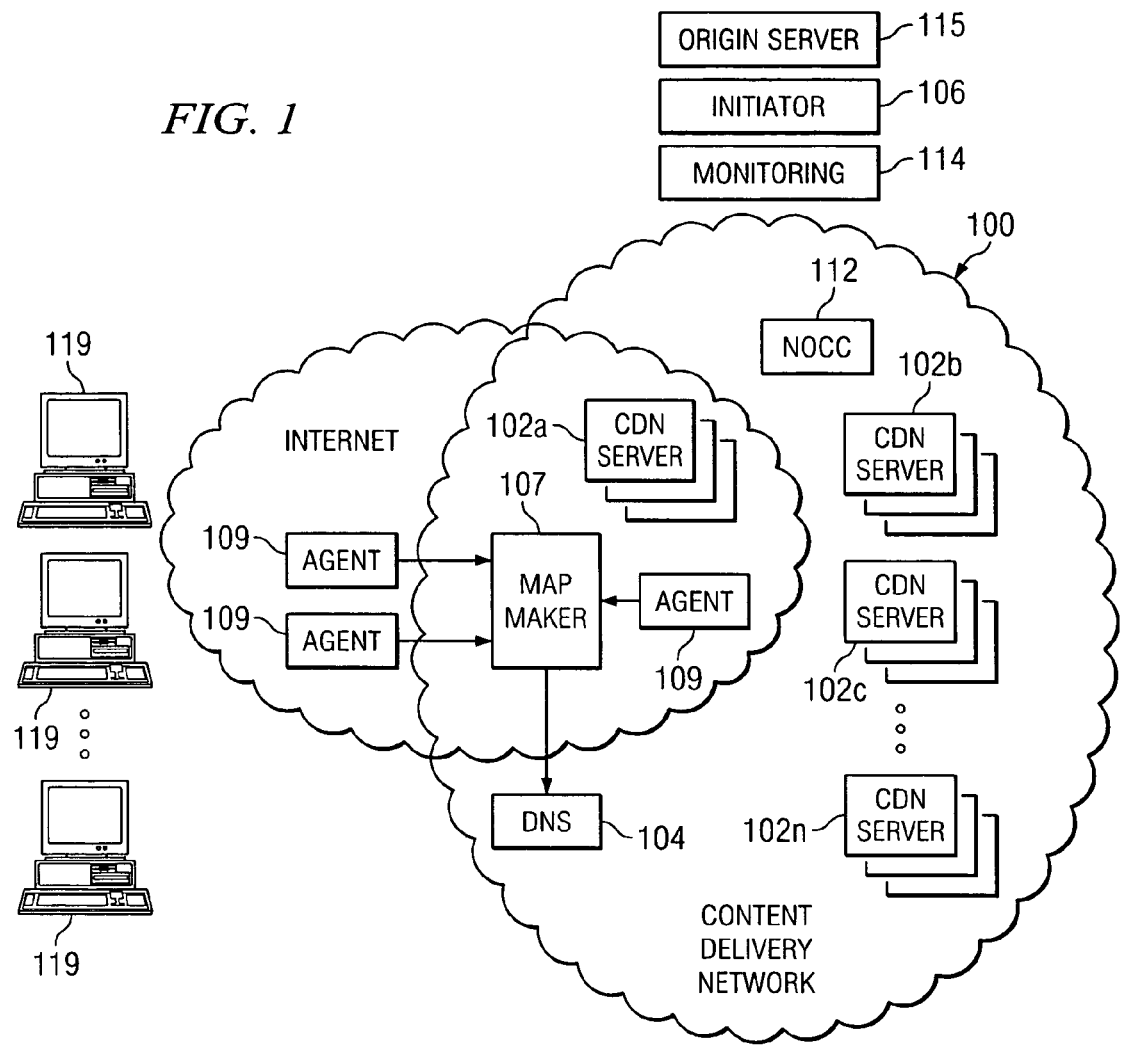
FIG. 1 is a block diagram of a known content delivery network in which the present invention may be implemented.

FIG. 1 is a diagram showing an illustrative content delivery network in which the present invention may be implemented. The content delivery service comprises a preferably global content delivery network (CDN) 100 of content delivery server regions 102a–n, a domain name service (DNS) system 104, and a content modification or "initiator" tool 106 that allows content to be tagged for inclusion on the network. DNS system 104 receives network mapping data from a map maker 107, which receives inputs from monitoring agents 109 distributed throughout the Internet. Agents typically perform various tests and monitor traffic conditions to identify Internet congestion problems. The map maker 107 takes the data generated from the agents and generates one or more maps detailing Internet traffic conditions. Generally, the content delivery service allows the network of content delivery server regions 102a–n to serve a large number of clients efficiently. Each region may include one or more content servers, with multiple content servers typically sharing a local area network (LAN) backbone. Although not meant to be limiting, a typical server is an Intel Pentium-based caching appliance running the Linux operating system with a large amount of RAM and disk storage. As also seen in FIG. 1, the content delivery service may include a network operations control center (NOC) 112 for monitoring the network to ensure that key processes are running, systems have not exceeded capacity, and that subsets of content servers (the so-called CDN regions 102) are interacting properly. A content provider operates an origin server (or server farm) 115 from which requesting end users 119 would normally access the content provider's Web site via the Internet. Use of the CDN avoids transit over the Internet for selected content as described below. The content provider may also have access to a monitoring suite 114 that includes tools for both real-time and historic analysis of customer data.

High-performance content delivery is provided by directing requests for web objects (e.g., graphics, images, streaming media, HTML and the like) to the content delivery service network. In one known technique, known as Akamai FreeFlow content delivery, HTTP and/or streaming media content is first tagged for delivery by the tool 106, which, for example, may be executed by a content provider at the content provider's web site 115. The initiator tool 106 converts URLs that refer to streaming content to modified resource locators, called ARLs for convenience, so that requests for such media are served preferentially from the CDN instead of the origin server. When an Internet user visit's a CDN customer's site (e.g., origin server 115) and, for example, selects a link to view or hear streaming media, the user's system resolves the domain in the ARL to an IP address. In particular, because the content has been tagged for delivery by the CDN, the URL modification, transparent to the user, cues a dynamic Domain Name Service (dDNS) to query a CDN name server (or hierarchy of name servers) 104 to identify the appropriate media server from which to obtain the stream. The CDN typically implements a request-routing mechanism (e.g., under the control of maps generated from the monitoring agents 109 and map maker 107) to identify an optimal server for each user at a given moment in time. Because each user is served from the optimal streaming server, preferably based on real-time Internet conditions, streaming media content is served reliably and with the least possible packet loss and, thus, the best possible quality. Further details of a preferred dDNS-based request-routing mechanism are described in U.S. Pat. No. 6,108,703, which is incorporated herein by reference.

Figure 2:
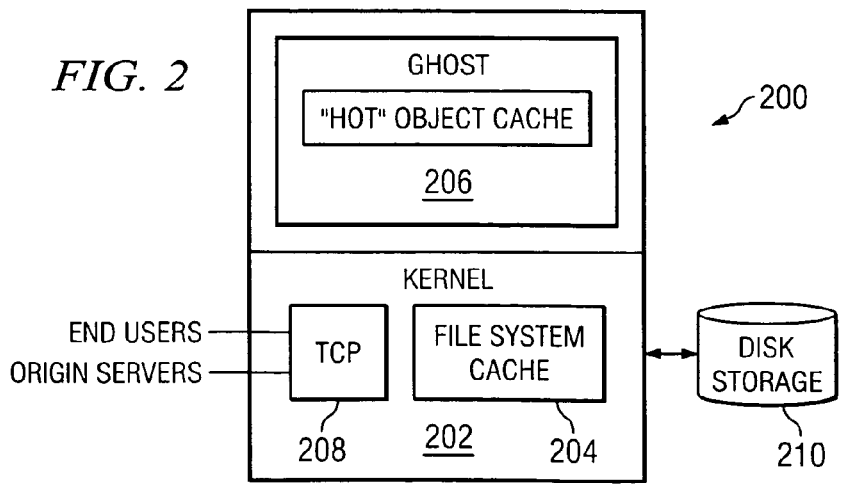
FIG. 2 is a simplified block diagram of a known CDN content server.
Figure 3:
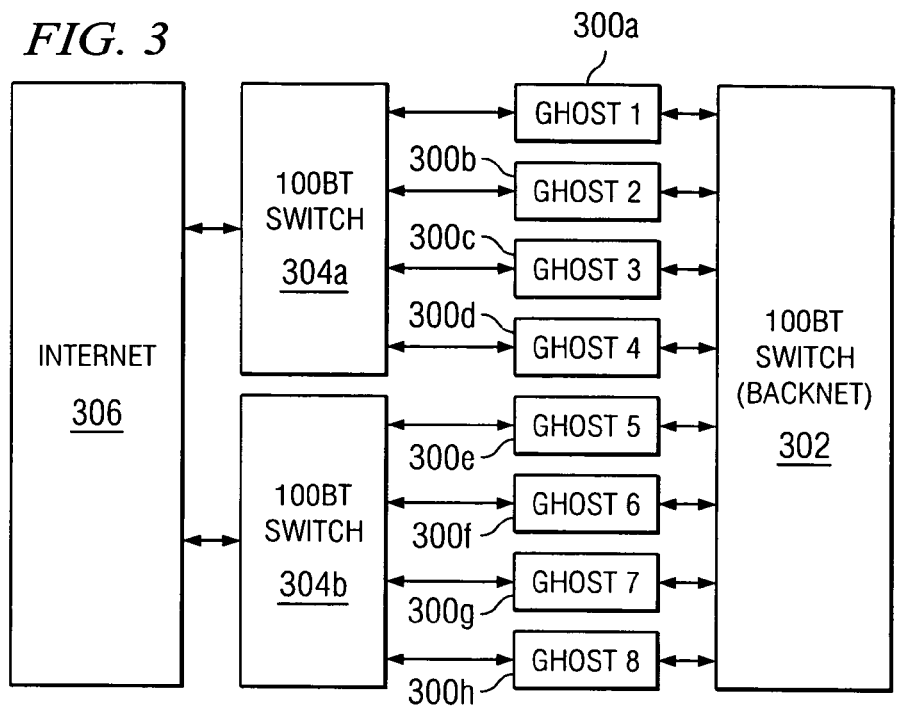
FIG. 3 is a simplified block diagram of how a CDN region may be implemented in the prior art.

FIG. 2 is a representative CDN content server 200. Typically, the content server 200 is a Pentium-based caching appliance running an operating system kernel 202 (e.g., based on Linux), a file system cache 204, CDN global host (or "ghost") software 206, TCP connection manager 208, and disk storage 210. CDN ghost software 206 is useful to create a "hot" object cache 212 for popular objects being served by the CDN. In operation, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss. In a CDN such as described above with respect to FIG. 1, a set of CDN content servers may be organized and managed together in a peer-to-peer manner as a CDN region. FIG. 3 illustrates one such CDN region. In this example, which is merely representative, the CDN region comprises two (2) sets of four (4) production servers 300a–h that are interconnected over a common backnet 302, which may be a conventional ethernet 100BT switch as illustrated. One or more ethernet swithes 304a–b may be used as a front end to interconnect the CDN region to the public Internet 306, an intranet, a virtual private network, or the like. Although not meant to be limiting, the production servers may be architectured as illustrated in FIG. 2 and described above.

A well-managed CDN has production servers that are frequently upgraded and enhanced with new software version. As a CDN grows in size, however, it becomes very difficult to test such new software and/or software versions given the scale of the network, the size of the codebase, the problems and deficiencies associated with laboratory or field-testing that have been discussed above. The present invention addresses this problem through a novel live-load systems testing infrastructure and methodology which are now illustrated and described.

Figure 4:
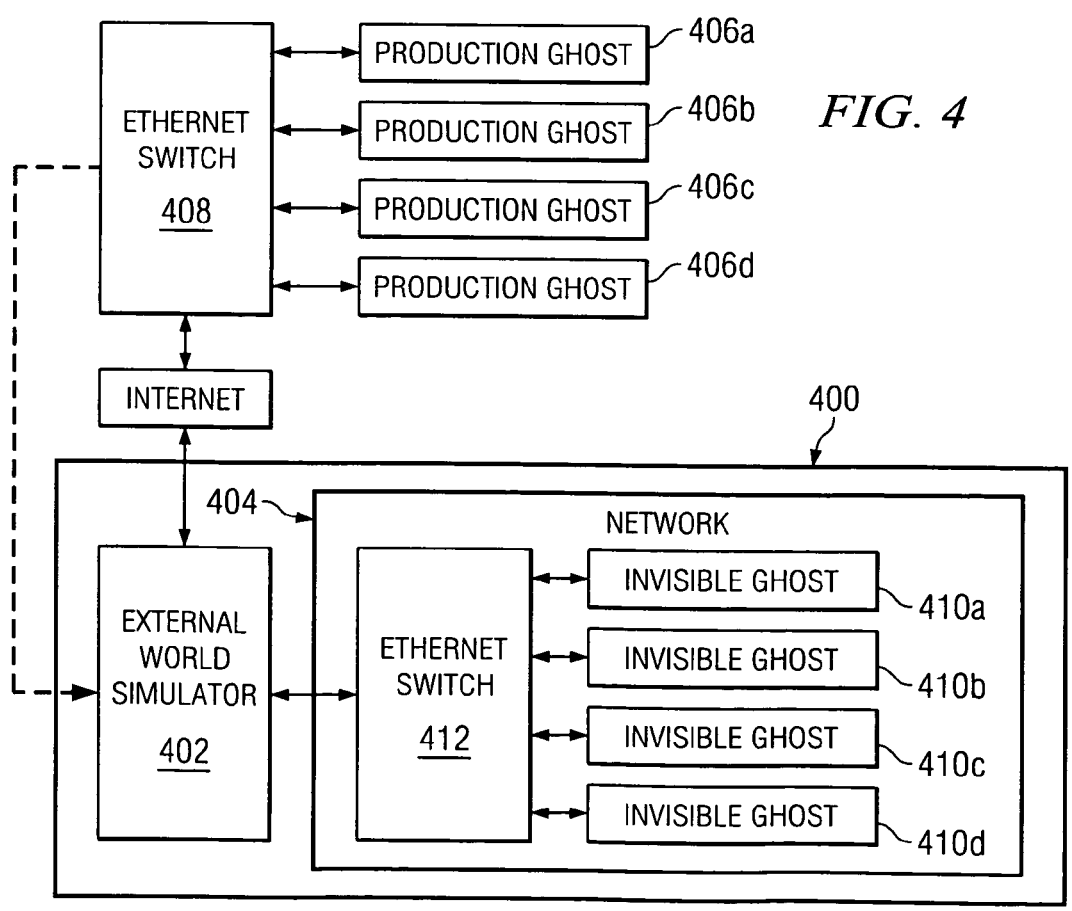
FIG. 4 is a block diagram of the inventive live-load testing system infrastructure of the present invention.

FIG. 4 illustrates an implementation of the testing infrastructure 400 in the context of a CDN region, which is an exemplary application testing environment. In this example, the infrastructure comprises an External World Simulator 402 that sits between the production system and the system under test (SUT) 404. The EWS listens promiscuously on a CDN region switch interface, rewrites incoming client packets bound for a production server to be routed to a beta server being tested, optionally compares the content and headers of the beta reply to the production reply, and black-holes (i.e. terminates) the client bound traffic from the beta server. An advantage this tool provides is the ability to put servers of an unknown quality into a live environment and to receive notification if the client experience differs from a known standard (as provided by the production servers). In this example, the production system is illustrated by the CDN production region comprising four (4) production ghost servers 406a–d and the ethernet front-end switch 408. The backnet is omitted for clarity. The SUT comprises a set of four (4) so-called "invisible" ghost servers 410a–d and the front-end switch 412. A backnet may be used as well. Preferably, there is one invisible ghost server under test for every production ghost server, although this is not a requirement. As noted above, the External World Simulator 402 monitors live traffic between the live production system and requesting clients (not shown) and replicates this workload onto the SUT 404. The EWS 402 provides high fidelity duplication (ideally down to the ethernet frame level), while compensating for differences in the output between the SUT and the live production system. Additionally, the EWS detects divergences between the outputs for corresponding pairs of SUT and live production servers (e.g., servers 406a and 410a, 406b and 410b, etc.), thereby allowing detection of erroneous behavior.

Although FIG. 4 illustrates a SUT with multiple invisible ghosts, this is not a limitation. The number of machines under test is variable, and may include just a single invisible ghost server, a full region of servers (such as illustrated), multiple regions, and the like. In addition, while preferably the infrastructure uses live system load for testing (i.e., CDN traffic is monitored and its traffic replicated in real-time to drive the SUT), a recorded trace may be captured by the EWS and replayed to the SUT at a later time for testing purposes.

The term "invisible" is merely a shorthand reference to the fact that the SUT is completely isolated from the outside world so that errors or crashes by this system do not affect either the CDN's customers (content providers) or end users. In particular, the basic constraint that is enforced is that the SUT never interacts with end users (namely, their web browsers). Consequently, the EWS serves as a proxy for the clients. By basing its behavior off the packet stream sent between clients and the live production system, the External World Simulator can simulate most of the oddities of real-world client behavior including, without limitation, mal-formed packets, timeouts, dropped traffic and reset connections. Ideally, the SUT is able to emulate all outside entities (e.g., end user web browsers, customer web servers, DNS servers, network time services, and the like) to which the production ghost server talks in a conventional CDN operation.

Although not meant to be limiting, the EWS preferably is a dual NIC, Intel/Linux-based machine running appropriate control routines for carrying out the above-described testing functionality. The production environment may be any commercial or proprietary Internet-, intranet- or enterprise-based content delivery network. An advantage this tool provides is the ability to put servers of an unknown quality into a live environment and to receive notification if the client experience differs from a known standard (as provided by the production servers). The tool may be augmented to allow one to route traffic from multiple production servers at a single test server—enabling a more realistic performance projection tool. In addition, to handle greater throughout, HTTP comparison can be disabled.

EWS enables monitoring of a production system to generate network-packet level accurate traffic. This provides an extremely high-fidelity workload for the test system. The external interaction may be at selectable test levels such as: HTTP request, IP packet, IP packet and timing, IP packet, timing and fragmentation. The EWS preferably handles various protocols, such as HTTP, HTTPS, and the like. The SUT response stream validation can be of varying degrees, such as limited, identical output and/or equivalent output. Thus, for example, the simulator may provide substantially limited validation that suffices for testing new versions for crashes and long-term memory leaks. The simulator may test for "identical" output, wherein the output of the system under test is checked for byte-for-byte equality with the production system. The simulator may also check for "equivalent" output, wherein the output of the SUT and the production system are checked for logical equivalence (isomorphism). This type of validation typically involves use of specific application-level logic (e.g., checking dates in HTTP headers to determine if two different versions of an object being returned to a requesting client are valid comparing the output of persistent multi-GET connection versus several simple GET requests, etc.). The particular equivalence checking logic will depend on the functionalities being implemented, of course. As noted above, the scale of the system under test may be a single server (or given processes or programs running thereon), a full region of servers, multiple regions, and the like, and the testing environment may be used with live system load or with recorded client traces.

Figure 5:
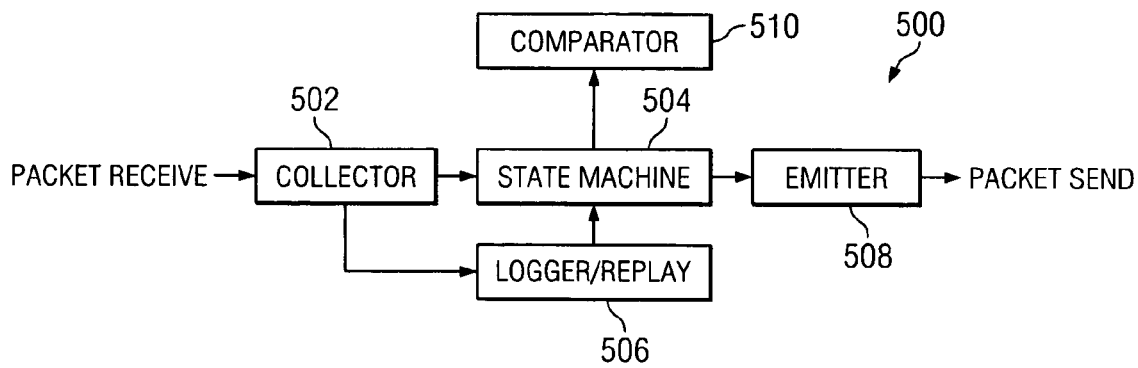
FIG. 5 is a block diagram illustrating a preferred architecture of the software modules that comprise the External World Simulator.

FIG. 5 illustrates one possible implementation of the External World Simulator. The EWS 500 comprises a set of software modules: a collector 502, a state machine 504, a logger 506, an emitter 508, and a comparator 510. Preferably, the modules communicate via frame queues and operate in both time-slice and threaded modes of operations. The collector 502 is responsible for acquiring packets from the network, preferably using a sniffing library routine, and it also receives responses from the invisible ghosts (because it is the entry point for the EWS). In particular, and although not meant to be limiting, preferably the collector 502 takes advantage of the port-monitoring feature of existing ethernet switches in the CDN region. The port-monitoring feature, used for management and monitoring, allows all traffic going through the switch to be seen on the configured port. The collector 502 pulls traffic from the switch port-monitor (using the sniffing library), performs filtering for interesting packets (e.g., HTTP traffic on the production ghost server), and then feeds those packets into the state machine 504 and the logger 506. The state machine 504 is the core logic of the EWS. It decides what packets should be sent and when. The state machine opens and closes connections between the participating entities, namely, the client, the production ghost server, and the invisible ghost server, as will be described in more detail below. The state machine also absorbs invisible ghost server responses to ensure that the SUT never interacts with the production servers. In particular, these response packets follow the path through the collector (the input to the EWS), and the state machine recognizes them as client-bound traffic and absorbs them.

As illustrated, the state machine 504 feeds packets into the emitter 508 and the comparator 510. The emitter 508 sends packets onto the network if needed, and isolates the state machine from the other functions. The comparator 510 assembles HTTP requests/responses from the TCP packets. It performs equivalence checking (depending on the application logic included) between the production ghost response and that of the invisible ghost. In one example, the checking verifies that HTTP response codes match. There may be some cases when the codes match but the content handed back (from the respective production ghost and the invisible ghost) differs, or the response code may not match when the content handed back is the same, and so on. The comparator may filter the data based on given criteria. Typically, the comparator writes given data to a log for later analysis. The comparator typically is HTTP-specific, and the other modules need not have any knowledge of what protocol is being used.

As noted above, the various modules that comprise the EWS enable the EWS to masquerade (to the SUT) as clients. As connections are opened and closed, the EWS duplicates the TCP traffic flowing through the production system. It parses the ghost TCP streams into HTTP responses, checks for equivalence (or other application-level logic validation), records mismatches for human or automated analsyis, and facilitates performance analyis of the SUT or the components thereof. As noted above, the EWS (specifically, the state machine) absorbs or "black-holes" the SUT responses passed from the invisible ghosts through the collector to isolate the SUT from the real-world.

Figure 6:
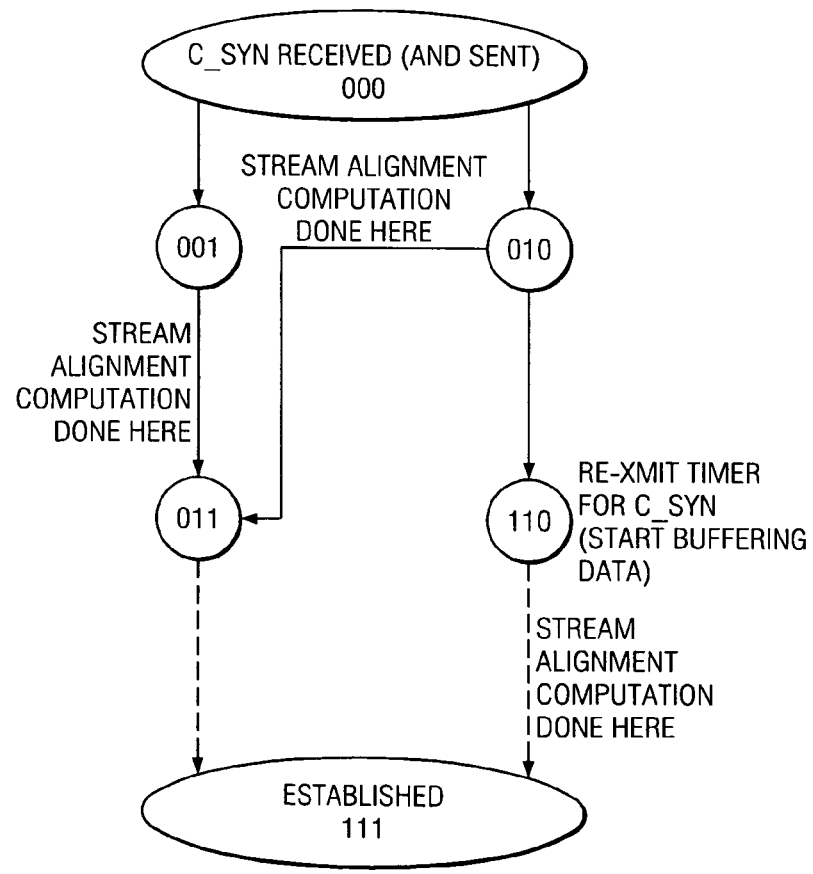
Figures 7, 8:
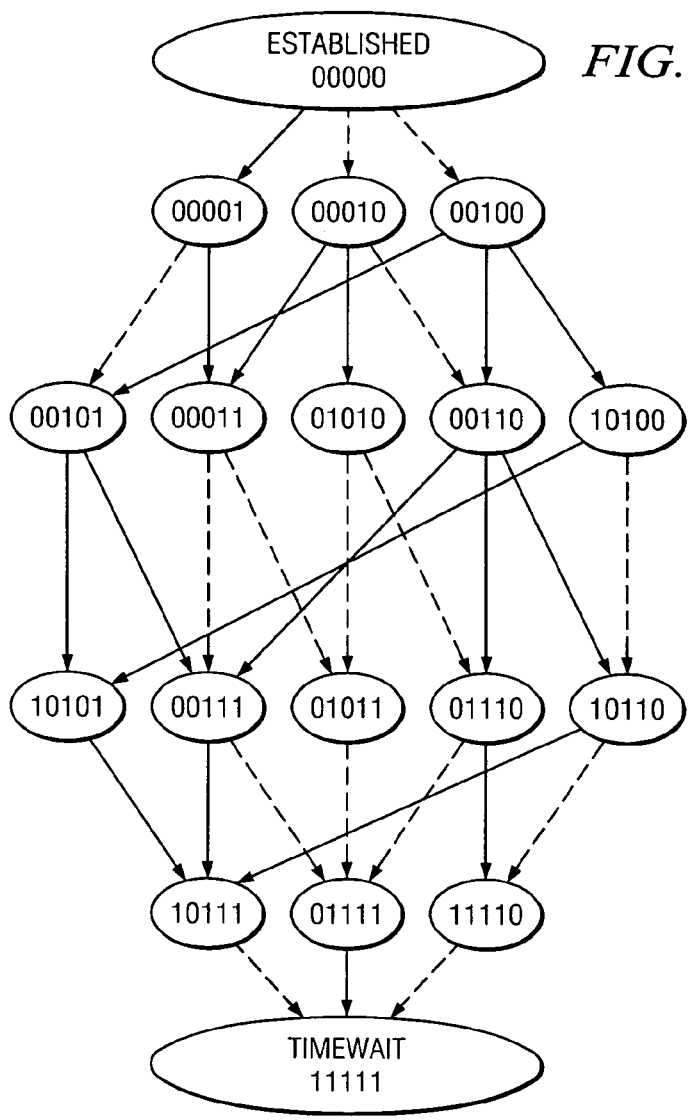

FIGS. 6–7 illustrate state changes of the state machine in response to receiving packets from the various endpoints of the connections. Normal TCP connections only have two (2) endpoints, namely, the client and the production server. In the testing infrastructure, on the contrary, three (3) endpoints exist, namely, the client, the production system server and the invisible ghost server. FIG. 6 is the opening state diagram, and FIG. 7 is the closing state diagram. This separation is for clarity and omits some possible states. For instance, the production system may start closing the connection before the invisible system has finished establishing it. In addition, the effect of reset packets is ignored for convenience as those packets are not considered part of a normal traffic flow. Familliarity with basic TCP operation is presumed. In the opening diagram (FIG. 6), the states are denoted by three (3) binary digits, a "1" in the position indicates that a particular packet has been received, and a "0" represents that it has not been received. For the opening states, the leftmost bit represents the client's first ACK, the middle bit the production server SYNACK, and the rightmost bit the invisible server SYNACK. It is assumed that the client SYN has already been received or the state machine would not be entered. There are more control packets sent as part of connection tear-down, as illustrated in the closing diagram (FIG. 7). The relevant packets examined are the invisible ghost fin (I_FIN), production server fin (P_FIN), client fin (C_FIN), and client finack of the client fin (I_ACK(C_F). Some packets that are part of the tear-down process for normal TCP connections are not relevant to the state machine. Different line types denote which packet was received that triggered the state change, and optionally what packet was sent as a result (indicated by an S( ), S(A) being an ACK, and S(F) being a FIN). Dashed lines are used for those state changes that include sending out a packet.

FIGS. 8–14 illustrate representative data generated by the testing infrastructure for a given connection. FIG. 8 illustrates the client-production server conversation for the connection. FIG. 9 illustrates how the EWS duplicates the connection open and how the invisible ghost under test responds. FIG. 10 illustrates how the EWS duplicates the client's first ack packet and the client request. FIG. 11 illustrates the production and invisible ghost responses. FIG. 12 illustrates the client acknowledgement, the EWS acknowledgement and FIN. FIG. 13 illustrates the connection close, and FIG. 14 illustrates a representative comparator report.

The present invention provides a number of new features and advantages. First, EWS enables monitoring of a production system to generate network-packet level accurate traffic that is then duplicated onto a SUT. This provides an extremely high-fidelity workload for the test system. Second, the output of the system is compared against the results of a running production system, which provides a very detailed check (if the new system is producing the desired results) without requiring the construction of a large number of test cases. Finally, the system under test is subjected to real world workload, but the system has no interactions with the outside.

The following illustrates various routines and data structures that may be used to implement the EWS modules described above:

---

Collector:

Structure Detail
frame_header_t - frame_header_t is the header structure that occurs inside all frames, a basic unit of memory management. A frame is the basic unit of allocation in IG. time_stamp is set by the collector (or replay logic) when a packet is generated. ref_count is a bitmap, indicating which subsystems have interest in this frame. When becomes zero, the frame should be freed.

```
typedef struct _frame_header_t {
    u_int32 frameno;
    struct timeval time_stamp;
    u_int16 refcount;
    u_int16 from_our_hw_addr:1;
    u_int16 to_our_hw_addr:1;
    u_int16 pad:13;
    u_int16 packet_size;
    u_int16 frame_size
    u_int16 ip_start;
    u_int16 tcp_start;
    u_int16 ip_tot_len;
    u_int32 ip_csum;
    u_int32 tcp_csum;
    u_int32 * page_cnt;
    struct _frame_t * sm_qnext;
} frame_header_t;
```

Fields:
| | |
|---|---|
| frameno | unique id, used for debugging |
| time_stamp | time of receipt of packets |
| refcount | reference count, used to determine frame liveness |
| from_our_hw_addr:1 | indicates whether frame originated locally |
| to_our_hw_addr:1 | indicates whether frame originated elsewhere |
| pad:13 | bits reserved for future use |
| packet_size | size of payload in this frame |
| frame_size | size of this frame, not including the header |
| ip_start | byte offset of ip data in the data area |
| tcp_start | byte offset of tcp header in the data area |
| ip_tot_len | length of ip payload, in bytes |
| ip_csum | calc'ed during copy from collector |
| tcp_csum | calc'ed during copy from collector |
| page_cnt | pointer to counter used for batch frame allocation |
| sm_qnext | linking pointer used by state machine. | frame_t - frames hold packet data inside IG. The actual length of the data array is stored in hdr.frame_size; Data contains the IP packet/fragment.

```
typedef struct _frame_t {
    frame_header_t hdr;
    byte data[4];
} frame_t;
```

Fields:
| | |
|---|---|
| hdr | frame header |
| data[4] | byte array holding packet data. | frame_ptr_array_t - the frame_ptr_array_t is a structure holding a fixed number of pointers to frame. It is used to pass frames from the collector to the state machine and logger.

```
typedef struct _frame_ptr_array_t {
    struct _frame_ptr_array_t * next;
    u_int32 n_ptrs;
```

-continued

```
    frame_t * frm_ptrs[PTRS_PER_FPA];
} frame_ptr_array_t;
        Fields:
        next                        used for linked listing
        n_ptrs                      number of live pointers in the array
        frm_ptrs[PTRS_PER_FPA]      array of frame pointers
Routine Detail
frm_collector_frame_alloc
Allocated as frame for use by the collector. The frame_size argument specifies the data payload
size of the frame. The frame header is initialized by this routine, but the frame data is not zero
filled.
frame_t * frm_collector_frame_alloc( u_int16      frame_size,
                                     frm_blk_t**  fb)
        Parameters:
        frame_size   size of frame to be allocated
        Returns:
        frame_t      * allocated frame, not necessarily zero-filled, NULL if unable to allocate
                       frame.
frm_fpa_alloc
allocates frame pointer arrays
frame_ptr_array_t * frm_fpa_alloc( )
        Returns:
        frame_ptr_array    is successful, NULL if unable to allocate
        Notes:
        Uses an internal memory pool, using the first word of each element as a chaining pointer.
        Allocates in groups of fpa_increment.
frm_fpa_free
frees frame pointer array
void frm_fpa_free( frame_ptr_array_t * fpa)
        Parameters:
        fpa           frame pointer array to free
frm_frame_set_interest
Sets reference count bits indicating specified sources using the frame. Any module is allowed to
set bits indicating that another module will be processing this frame. It is not an error to set an
interest bit that is already set.
void frm_frame_set_interest(  frame_t *  frm,
                              u_int8     interest_bits)
        Parameters:
        frm             frame of interest
        interest_bits   bit mask sources of interest.
        Example:
        // logger is in replay mode, wants to make frames
        // of interest to state machine before handing off.
          frame_t * frm;
          // . . . read frame from disk
          frm_frame_set_interest(frm, FRM_BIT_SM);
          // queue frame to state machine
frm_frame_clear_interest
Clears the interest bit indicated by the model. An module should only clear its own interest bit. If
them mask drops to zero, the frame will be freed as a side effect of this routine. Clearing an
already clear bit is an error.
void frm_frame_clear_interest( frame_t *  frm,
                               u_int8     interest_bit)
        Parameters:
        frm             frame of interest
        interest_bit    bit to clear
frm_blk_frame_clear_interest
Clears interest bit in all the frames in the frame block
extern void frm_blk_frame_clear_interest( frm_blk_t * blk,
                                          u_int8      interest_bit)
        Parameters:
        blk             Block of interest
        interest_bit    interest bit to be cleared
                            State Machine:

Routine Detail
sm_init
configuration entry point of state machine
extern void sm_init(config_info_t * ci)
        Parameters:
        ci                  configuration information
sm_dowork
event entry point of state machine system. Will yield after procesing yield_frames (or slightly
more) or when runs out of work.
extern void sm_dowork(u_int32 yield_frames)
        Parameters:
        yield_frames        after how many frames to yield.
sm_shutdown
Called on shutdown. Use to dump summary stats, etc
```

-continued

```
void sm_shutdown( v oid)
Routine Detail
sti_update_cur_time (internal)
update notion of current time.
void sti_update_cur_time( )
sti_delayed_ack_timeout (internal)
update/start delayed partial ack timer
void sti_delayed_ack_timeout(  sm_state_ply_t *     ply,
                               u_int32              ackval)
        Parameters:
        ply             connection to update
        ackval          value to ack
sti_drain_ack_timeout (internal)
update/start drain ack timer
void sti_drain_ack_timeout(sm_state_ply_t * ply)
        Parameters:
        ply             connection to update
sti_set_zero_timeout (internal)
set zero timer. basically means there is more ci data to send.
void sti_set_zero_timeout(sm_state_ply_t * ply)
        Parameters:
        ply             connection to update
sti_set_cfn_delay_timeout (internal)
don't delay sending the CFN too long.
void sti_set_cfn_delay_timeout(sm_state_ply_t * ply)
        Parameters:
        ply             connection to update
sti_delayed_ack_timeout_cancel (internal)
Cancel delayed ack timer
void sti_delayed_ack_timeout_cancel(sm_state_ply_t * ply)
        Parameters:
        ply             connection to update
sti_update_idle_timeout (internal)
update idle timer for the connection
void sti_update_idle_timeout(sm_state_t * state)
        Parameters:
        state           connection to update
sti_restart_idle_timeout (internal)
Restart idle timeout, or indicate connection death
u_int32 sti_restart_idle_timeout(sm_state_t * state)
        Parameters:
        state           connection to update
        Returns:
        0               connection should be terminated
        1               connection is ok, idle time reset.
        Notes:
        (internal)
        An idle timeout has expired. Check if state->last_packet_time to determine if this
        connection has really been idle long enough to be terminated. If connection should be
        kept alive, idle timer is reset.
sti_restart_cfn_timeout (internal)
Restart client fin delay timeout, or indicate fin should be sent.
u_int32 sti_restart_cfn_timeout(sm_state_t * state)
        Parameters:
        state           connection to update
        Returns:
        0               connection should be terminated
        1               connection is ok, idle time reset.
sti_timer_syn_rexmit_start (internal)
Start CSN retransmit timer
void sti_timer_syn_rexmit_start(sm_state_ply_t * ply)
        Parameters:
        ply             state block
sti_timer_syn_rexmit_cancel (internal)
Start CSN retransmit timer
void sti_timer_syn_rexmit_cancel(sm_state_ply_t * ply)
        Parameters:
        ply             state block
sti_set_timeout (internal)
Set or update absolute timer.
void sti_set_timeout(  void **          timer,
                       void *           data,
                       u_int32          index,
                       u_int32          datum,
                       struct timeval * time)
        Parameters:
        timer           pointer to timer to be set or reset
        data            opaque ptr index
        index           integer index
```

| | | |
|---|---|---|
| datum | integer item stored | |
| time | time to expire | |

Notes:
(internal)
Upon return *timer will point to the timer. If *timer is non-NULL upon the call, it is a presumptive old timer with the same (data,index) and will be freed.

sti_set_rel_timeout (internal)
Update or set relative timer

```
void sti_set_rel_timeout(  void **         timer,
                           void *          data,
                           u_int32         index,
                           u_int32         datum,
                           struct timeval * rel_time)
```

Parameters:

| | |
|---|---|
| timer | pointer to timer to be set or reset |
| data | opaque ptr index |
| index | integer index |
| datum | integer item stored |
| rel_time | time to expire (from now). |

Notes:
(internal)
Same as sti_set_timeout, except computes the absolute time of the timeout based on the current time and rel_time.

sti_remove_timeout (internal)
Removes the timeout specified by *timer. Error to remove a non-present timeout. Will set *timer to NULL on return.

void sti_remove_timeout( void ** timer)

Parameters:
timer          pointer to timer sti_remove_all_timeouts (internal)
Clean up timeouts
void sti_remove_all_timeouts(sm_state_t * state)

Parameters:
state          structure to clear

Notes:
(internal)
Removes all timeouts with this state structure, including subtypes.

sti_min_timeout (internal)
determine waiting time
void sti_min_timeout(struct timeval * wait_time)

Parameters:
wait_time      see below

Notes:
(internal)
wait_time, on input, should be set to the maximum time (relative to the last call to sti_do_expired) that we should block.
On return wait_time is the time to block for. It will be no more than the input value, and possibly shorter.

sti_do_expired (internal)
invoke and remove expired timers
void sti_do_expired( )

Notes:
(internal)
Finds set of expired timers, copies them and calls back smt_expired_timer. It is safe from the callback to manipulate the current timer.

Structure Detail
epkt_t - struct containing the head of a TCP packet. Used to building packets from scratch or rewrite existing packets.

```
typedef struct_epkt_t {
    struct iphdr ip;
    struct tcphdr tcp;
} epkt_t;
```

Fields:
ip             ip header
tcp            tcp header

Routine Detail
smu_state_hash (internal)
looks up entry in tcp hash table. Tries both the src and dst pairs as possible keys. src_is_client is set to TRUE if the src_ip address corresponds to the client, and FALSE otherwise.

```
sm_state_t * smu_state_hash(  u_int32 src_ip,
                              u_int16 src_port,
                              u_int32 dst_ip,
                              u_int32 dst_port,
                              u_int32 src_class,
                              u_int32 dst_class,
                              u_int16 seq_id)
```

Parameters:
src_ip         ip address of source
src_port       tcp port of source -continued

```
        dst_ip         ip address of destination
        dst_port       tcp port of destination
        src_class      SMT_IP_PG, SMT_IP_IG or SMT_IP_CI
        dst_class      SMT_IP_PG, SMT_IP_IG or SMT_IP_CI
        seq_id         DNS sequence id, or 0 for any other protocol.
    Returns:
        -              hash entry, if it exists
        NULL           entry not in table
smu_state_hash_alloc (internal)
Creates a hash entry for the specified datum.
sm_state_t * smu_state_hash_alloc(  u_int32 src_ip,
                                    u_int16 src_port,
                                    u_int32 dst_ip,
                                    u_int32 dst_port,
                                    u_int32 src_class,
                                    u_int32 dst_class,
                                    u_int32 conntype,
                                    u_int16 seq_id)
    Parameters:
        src_ip         ip address of source
        src_port       tcp port of source
        dst_ip         ip address of destination
        dst_port       tcp port of destination
        src_class      SMT_IP_PG, SMT_IP_IG or SMT_IP_CI
        dst_class      SMT_IP_PG, SMT_IP_IG or SMT_IP_CI
        conntype       on of SM_C_*
        seq_id         DNS sequence id, or 0 for any other protocol.
    Returns:
        -              hash entry, after creating it.
smu_state_hash_free (internal)
Releases memory and pointers to the named hash entry. All removes any times associated with
the state or the type specific state structures.
void smu_state_hash_free(sm_state_t * lamb)
    Parameters:
        lamb           hash entry to be freed.
smu_classify_ip (internal)
Checks an IP address against known tables of invisible and production ghosts, and returns a
classification.
u_int32 smu_classify_ip(u_int32 ip)
    Parameters:
        ip             ip address
    Returns:
        SMT_IP_IG      if address of an invisible ghost
        SMT_IP_PG      if address of a production ghost
        SMT_IP_UN      otherwise.
smu_valid_tcp_packet (internal)
Validates that the packet contains properly checksumed IP header and TCP header and data. As a
side effect, fills in many of the fields.
int smu_valid_tcp_packet(  frame_t * frm,
                           u_int32 ip_start)
    Parameters:
        frm            frame to verify
        ip_start       start of ip data in frame
    Returns:
        0              if not a valid TCP or IP packet
        1              if valid IP packet
        2              if valid TCP packet
    Notes:
        Assumes packet header and payload are aligned on word boundaries.
smu_flush (internal)
Flush any remaining work items before blocking.
void smu_flush( v oid)
smu_forward_frame (internal)
queue frame for emission by the emitter. The sm module is done with the frame. Before the sm
blocks, it should call sm_flush. This frame is known to be a valid IP frame
void smu_forward_frame(frame_t * frm)
    Parameters:
        frm            frame to be forwarded
smu_send_packet (internal)
queue frame for emission by the emitter. This is the fully generic version of the function which
takes all params.
void smu_send_packet(  emt_work_t * pinfo,
                       int          opcode)
    Parameters:
        pinfo          all of the information about the packet-to-be
        opcode         EMT_PK_REWRITE_DATA or EMT_PK_SEND
    Notes:
        send_fin is only examined for opcode type EMT_PK_REWRITE_DATA. Note send_fin
        = 0 means a FIN should be surpressed in the header if it was already there.
```

-continued

```
smu_cmp_frame (internal)
SM is done with this frame; hand it off to the comparator. Whom is one of
SMT_IP_{IG,PG,UN}. Before the sm blocks, it should call sm_flush.
void smu_cmp_frame(    frame_t *       frm,
                       sm_state_t *    state,
                       u_int32         whom)
        Parameters:
        frm             frame to comparator
        whom            flag indicating who sent this packet
smu_cmp_done (internal)
Queue end of stream comparision indicator to comp
void smu_cmp_done(sm_state_ply_t * ply)
        Parameters:
        ply             state structure
smu_unknown_connection_frame (internal)
received a frame for whom we can't find a connection;
void smu_unknown_connection_frame(  sm_state_t *    state,
                                    frame_t *       frm,
                                    u_int32         whom)
        Parameters:
        state           connection
        frm             frame
        whom            what to with frame
smu_q_drop_all (internal)
Walk a link-list (linked by sm_qnext), freeing (smu_drop_frame'ing) all the frames.
int smu_q_drop_all(  sm_f_t * l)
        Parameters:
        l               sm_f_t list to free
        Returns:
        –               number of packets freed
smu_q_frm (internal)
Insert frame at tail of fifo
void smu_q_frm(    frame_t *    frm,
                   sm_f_t *     l)
        Parameters:
        frm             frame to insert
        l               Fifo
smu_enter_timewait (internal)
Entering timewait state; trigger comparision.
void smu_enter_timewait(sm_state_ply_t * ply)
        Parameters:
        ply             state block
smu_send_reset (internal)
generate a reset against the specified packet.
void smu_send_reset(frame_t * frm)
        Parameters:
        frm             packet which triggered the reset
smu_send_ack (internal)
generate an ack packet on the specified connection.
void smu_send_ack(    sm_state_ply_t *    ply
                      u_int32             ack,
                      u_int32             win)
        Parameters:
        ply             connection state structure
        ack             absolute ack sequence number to send
smu_send_fin (internal)
generate an ack packet on the specified connection.
void smu_send_fin(sm_state_ply_t * ply)
        Parameters:
        ply             connection state structure
smu_send_syn (internal)
generate a SYN packet on the specified connection.
void smu_send_syn(sm_state_ply_t * ply)
        Parameters:
        ply             connection state structure
smu_cmp_state_done (internal)
Queue end of stream comparision indicator to comp
void smu_cmp_state_done(sm_state_t * state)
spc_ack (internal)
Helper function to spc_dack that does ack transmission.
int spc_ack(    sm_state_ply_t *    ply,
                u_int32 *           ack,
                u_int32 *           window)
        Parameters:
        ply             state structure
        ack             ack to send
        window          window to send
        Returns:
        0               if nothing needs to be done
```

| | |
|---|---|
| 1 | if the ack/window should be sent immediately |
| 2 | if the ack/window sending can be delayed |

Notes:
(internal)
Logic: Acks are queued in the order received, and processed in the same order. Loop over the queued acks, sending all acks that are less than the last byte of data sent by the invisible ghost. If an ack is found to be in the ahead of the data, call smc_determine_ack to see if a frame boundary near the ack can be found. If a frame boundary bigger than the last sent ack is found, we consider it for sending. This ack is sent if (1) the suggested ack equals the recorded ack or (2) force_partial_ack is set. If an ack is fully consumed, we delete it.
Drain states arrive when we expect no more acks from the client, but want to pull all remaining data from the invisible ghost. In the drain state, we simply generate an ack every time we see there is unacked IG data.
Once we have started sending acks because of drain, we ignore any clients acks from then on.
Force partial acks is overloaded: in drain mode, force_partial is a signal to generate an ack.

spc_data (internal)
Helper function to spc_dack that does data transmission.
```
void spc_data( sm_state_ply_t *   ply,
               u_int32 *           data_seq,
               char **              data,
               u_int16 *           data_len,
               frame_t **          frm)
```
Parameters:
| | |
|---|---|
| ply | state structure |
| data_seq | sequence number of data start |
| data | pointer to data |
| data_len | length of data |
| frm | frame which data points into |

Notes:
(internal)
Logic: loop over data, sending any data currently allowed by the ig transmission window. If the window causes a packet to be fragmented, we fragment it and send it on. Once a packet is completely sent, we move it from the outside_window list to the sent_not_acked list. Both lists are maintaining in increasing order.
One complication may arises from HTTP persistent connections. If a browser has a persistent connection open to a production ghost (PG), and the PG initiates the close, one will typically see the sequence:
pg_data ci_ack (long pause) pg_fin ci_fin_ack (long pause)
then when the browser tries to reuse the connection
c_data p_reset. This is followed by the browser opening a new connection to the server to fetch whatever URL-get was reset.
In order to avoid the IG from processing these URLs twice, we don't send on any client data received after a PFN/CFA until we see an IFN. Once the IFN recieved, we push on client data, which should then generate a reset.

spc_determine_ack (internal)
determine an ack value
```
u_int32 spc_determine_ack( sm_state_ply_t *   ply,
                           u_int32            new_ack,
                           int                examine_sna)
```
Parameters:
| | |
|---|---|
| ply | state block |
| new_ack | base of new ack |
| examine_sna | boolean, wether to look at sent not acked. |

Returns:
| | |
|---|---|
| 0 | if no ack to be generated |
| – | 0 relative ack otherwise. |

Notes:
(internal)
If examine_sna == FALSE, just use ply->ci.acks + spontaneously acked.
if there is data in ply->ig.sent_not_acked, see if it is now covered. Lots of crufty segment alignment logic
Caller should sweep ig.sent not_acked and outside_window.

spc_release_ig_data (internal)
spc_release_ig_data is invokved whenever the EWS sends the IG a new ack. The routine walks through the invisible ghost sent_not_acked list, looking for packets that have been fully acked.
```
void spc_release_ig_data( sm_state_ply_t *   ply,
                          u_int32            ack)
```
Parameters:
| | |
|---|---|
| ply | state block |
| ack | new client ack value, 0 relative | spc_release_cli_data (internal)
spc_release_cli_data is invoked whenever the IG sends a greater ack value. The routine walks through the cli sent_not_acked list, looking for packets that have been fully acked. Uses ply->ig.acks as the ack value.
```
void spc_release_cli_data(sm_state_ply_t * ply)
```
Parameters:

```
        ply             state block
spc_timeout_ack (internal)
The timer associated with a delayed partial ack has gone off. If we have not advanced beyond
that ack, force a partial ack transmission.
void spc_timeout_ack(   sm_state_ply_t *   ply,
                        u_int32            ackno)
        Parameters:
        ply             state block
        ackno           delayed ack number
Structure Detail
sm_state_t - primary state vehicle for TCP connections. The index into the hash table will be the
(client ip,prt).
typedef struct_sm_state_t {
    struct_sm_state_t * next;
    struct_sm_state_t * lru_next;
    struct_sm_state_t * lru_prev;
    u_int32 ci_ip;
    u_int32 pg_ip;
    u_int32 ig_ip;
    u_int16 ci_port;
    u_int16 pg_port;
    u_int16 ig_port;
    u_int16 conntype;
    u_int32 hash_index;
    struct timeval last_frame_time;
    void * timer_idle;
    void * type_specific;
    u_int16 ipproto;
    u_int16 rec_pkts;
} sm_state_t;
        Fields:
        next            linked list construction
        lru_next        linked list for old connection removal
        lru_prev        linked list for old connection removal
        ci_ip           client ip address
        pg_ip           production ghost ip address
        ig_ip           invisible ghost address
        ci_port         client TCP port
        pg_port         production ghost TCP port
        ig_port         invisible ghost port
        conntype        which of SM_C_*
        hash_index      index into the hash table for sm
        last_frame_time timestamp at which last frame arrived
        timer_idle      pointer to idle timer
        type_specific   info specific to conntype
        ipproto         packet protocol (tcp/udp/ip)
        rec_pkts        origin of received packets on this state (ci | ig | pg)
sm_f_t - Helper structure used to maintain FIFO connections. Uses frame->hdr.sm_qnext for its
linked lists.
typedef struct _sm_f_t {
    frame_t * head;
    frame_t * tail;
} sm_f_t;
        Fields:
        head            head of linked list
        tail            tail of linked list
sm_h_t - Helper structure used inside sm_state_ply_t
typedef struct _sm_h_t {
    u_int32 seqbase;
    u_int32 sent;
    u_int32 acks;
    u_int32 win;
    sm_f_t sent_not_acked;
    sm_f_t outside_window;
    u_int32 fin_sno;
    u_int16 ip_id;
    u_int16 options;
    u_int16 mss;
    u_int16 win_scale;
} sm_h_t;
        Fields:
        seqbase         initial sequence number
        sent            0-relative highest data sequence number sent
        acks            0-relative highest ack sent
        win             current window
        sent_not_acked  link-listed of packets sent, but not acked
        outside_window  data packets outside the send window
        fin_sno         fin sequence number (not zero-relative)
        ip_id           id field of last ip packet seen; used to detect out of order packets
```

-continued

```
        options         options sent with SYN
        mss             advertised mss
        win_scale       window scale in this direction (currently unused)
        Notes:
        (internal)
        One is maintained for each of the client, production ghost and invisible ghost.
sm_state_ply_t - state holder for play'd (split descriptions)
typedef struct __sm_state_ply_t {
    u_int32 m_state;
    u_int32 syn_retries:27;
    u_int32 cmp_done:1;
    u_int32 reuse_protect:1;
    u_int32 started_draining:1;
    u_int32 timewait:1;
    u_int32 spontaneously_acked;
    u_int32 ci_lastack;
    u_int32 ci_ack;
    u_int32 ci_win;
    void * timer_dack_xmit;
    sm_state_t * sm_state;
    sm_h_t ci;
    sm_h_t pg;
    sm_h_t ig;
    sm_f_t ci_acks;
} sm_state_ply_t;
```

Fields:
        m_state             internal TCP state.
        syn_retries:27      syn rexmit counter
        cmp_done:1          flag: has smu_cmp_done been invoked?
        reuse_protect:1     flag: SYN arrived on live connection
        started_draining:1  flag: has a drain mode ack been sent
        timewait:1          flag: wait a bit before removing connection
        spontaneously_acked number of bytes spontaneously acked
        ci_lastack          last ack sent to ig
        ci_ack              last ack received from ci
        ci_win              last window received from ci
        timer_dack_xmit     timer for DACK rexmit
        sm_state            backpoint to parent
        ci                  client state
        pg                  production ghost state
        ig                  invisible ghost state
        ci_acks             FIFO of client acks ahead of data
        Notes:
        (internal)
        reuse_protect is set when a connection is draining and new a syn from the same client
        (ip/port) arrives. Reuse_protect causes all packets from the pg and client to be thrown
        away, giving the ig a chance to finish the first connection.
        m_state = state bits from internal open state machine or'ed with state bits from close state
        machine << 5;
        The index into the hash table will be the (client ip,prt).

Routine Detail
smt_process_log (internal)
Processes a packet in the tcp subsystem. If processed, the frame may have been freed. Assumes
caller has determined that this a valid TCP/IP frame.
void smt_process_log(   frame_t *       frm,
                        sm_state_t *    state)
        Parameters:
        frm             frame to be processed
        state           structure associated with the connection
        Returns:
        0               if processed frame
        1               if did not process frame
smt_process_fwd (internal)
Processes a packet in the tcp subsystem. If processed, the frame may have been freed. Assumes
caller has determined that this a valid TCP/IP frame.
void smt_process_fwd(   frame_t *       frm,
                        sm_state_t *    state)
        Parameters:
        frm             frame to be processed
        state           structure associated with the connection
        Returns:
        0               if processed frame
        1               if did not process frame
smt_ply_h_nullx (internal)
Processes a packet in the tcp subsystem. This is the workhorse routine for the state machine.
Preferably, it is split up into 3 sections, depending on where the packet originated from. The
entire state machine can be implemented in one function by noting that the states are path
invariant, i.e., it does not matter how the state was arrived at, only that it is in a given state.
Because of this, behavior can be determined based on specific packets by doing simple checks to -continued make sure appropriate packets have been seen earlier. In addition to managing the state
according to the state machine, all the data flow/aknowledgement logic is handled either in this
routine or by helper functions. Often, the acks generated by the client will not line up with the
data packets sent by the invisible ghost.
void smt_ply_h_nullx(   sm_state_t *    state,
                        frame_t *       frm)
    Parameters:
    state        structure associated with the connection
    frm          frame to be processed
    Returns:
    0            if processed frame
    1            if did not process frame
smt_process_ply (internal)
Processes a packet in a split stream. Assumes caller has determined that this a valid TCP/IP
frame.
void smt_process_ply(   frame_t *       frm,
                        sm_state_t *    state)
    Parameters:
    frm          frame to be processed
    state        structure associated with the connection
    Returns:
    0            if processed frame
    1            if did not process frame
smtcp_doframe (internal)
Determines if a packet is part of an existing connection. If not, do we need to create a connection
for it, and if so, what type of connection? If processed, the frame may have been freed. Assumes
caller has determined that this a valid TCP/IP frame.
u_int32 smtcp_doframe(  frame_t *       frm,
                        u_int32         ip_start)
    Parameters:
    frm          frame to be processed
    ip_start    byte offset of the start of the TCP header
    Returns:
    0            if processed frame
    1            if did not process frame
smt_ply_free (internal)
Closing down a smt_ply structure. Let the comparator know its time to compare these streams.
static void smt_ply_free(sm_state_ply_t * ply)
    Parameters:
    ply          state block to be freed
smt_idle_timeout (internal)
handle idle timer expiration
void smt_idle_timeout(sm_state_t * state)
    Parameters:
    state        control block of timeout
    Notes:
    (internal)
    Idle timeout has gone off for this connection. The idle timeout of a connection is updated
    lazily, so this does not mean the connection has been necessarily idle for this long. Call
    sti_idle_restart to restart the timer (if not really expired) or otherwise really expire the
    connection.

Logger/Replay:

Design
The logger module is intended to provide the following pieces of functionality.
First, to log all frames as they are gathered by the collector. (Optionally, one might want the
logger to be selective - for example, to only log the client generated packets.)
Second, to be able to play back a saved packet trace, simulating the collector. Additional desired
functionality would be to compare the world simulator output from a saved run to a new run to
check for regression.
Routine Detail
lgg_init
configuration entry point of logging subsystem
extern void lgg_init(   config_info_t * ci,
                        int             nowrite)
    Parameters:
    ci           configuration information
    nowrite     if set, force the logger to not log
lgg_shutdown
Shut down logger/write last disk block
void lgg_shutdown( v oid)
lgg_dowork
event entry point of logging subsystem.
extern void lgg_dowork( )
lgg_replay
Entry point for log replay
int lgg_replay( int tcpdumpmode)
    Parameters:
    tcpdumpmode   (boolean) if set, just dump instead of replaying -continued Returns:
    0          if the replay completed successfully.
    Notes:
    The specified log file will be opened in turn and played back. Play back means to send
    each logged packet back through the logger interface and into the state machine
debug_print_frame
tcpdump style description of the packet in frm.
void debug_print_frame(   frame_t *  frm,
                         FILE *    filedes)
    Parameters:
    frm            frame to be printed.
    filedes        stream in which to write the information.
    Notes:
    This routine is primarily for debugging.

Comparator:

CWT_PER_CWA - number of cmp_work_t pointers in a cmp_work_array_t
define CWT_PER_CWA 10
Structure Detail
cmp_work_t - If frame is non-NULL, then this a frame for the comparator to analyze, and type
indicates the source of the frame: SMT_IP_{PG,IG,UN} for invisible ghost, production ghost
and unknown (presumptive client) respectively. If frame is NULL, this packet indicates a set of
flows that ready to compare. Included is a triple of ci, production, and invisible ghost ip and
ports, respectively. The ports are in host order, while the ip addresses are in network order.
typedef struct {
    frame_t * frame;
    u_int32 conn_id;
    u_int32 ci_ip;
    u_int32 pg_ip;
    u_int32 ig_ip;
    u_int16 ci_port;
    u_int16 pg_port;
    u_int16 ig_port;
} cmp_work_t;
    Fields:
    frame        TCP frame
    conn_id      Connection id
    ci_ip        clientip (network order)
    pg_ip        production ghost ip (network order)
    ig_ip        invisible ghost ip (network order)
    ci_port      client port (host order)
    pg_port      production ghost port (host order)
    ig_port      invisible ghost port (host order)
cmp_work_array_t - Batched vector of work items for the comparator to process.
typedef struct _cmp_work_array_t {
    struct _cmp_work_array_t * next;
    u_int32 n_elt;
    cmp_work_t work_elt[CWT_PER_CWA];
} cmp_work_array_t;
    Fields:
    next                          next work array in the list
    n_elt                        number of live work items
    work_elt[CWT_PER_CWA]    array of work items

Emitter:

Structure Detail
pseudo_hdr_t - The pseudo header for UDP/TCP checksumming as defined by the TCP/IP spec.
typedef struct _pseudo_hdr_t {
    u_int32 saddr;
    u_int32 daddr;
    u_int8 zero;
    u_int8 proto;
    u_int16 len;
} pseudo_hdr_t;
    Fields:
    saddr    source IP address.
    daddr    dest IP address.
    zero     pad byte.
    proto    protocol number.
    len      UDP/TCP packet length including header.
emt_work_t - Contains a single unit of work for the emitter thread.
typedef struct _emt_work_t {
    char * data;
    char options[40];
    frame_t * frm_ptr;
    int opcode;
    u_int32 saddr;
    u_int32 daddr;
    u_int32 seq;

-continued

```
    u_int32 ack;
    u_int32 frm_win;
    u_int16 sport;
    u_int16 dport;
    u_int16 data_len;
    u_int16 opt_len;
    u_int8 flags;
} emt_work_t;
        Fields:
        data            TCP payload pointer.
        options[40]     TCP options.
        frm_ptr         Frame to build new packet off of.
        opcode          Specifies some work to be done on the frame.
        saddr           Source address.
        daddr           Destination address.
        seq             sequence number.
        ack             ack sequence number.
        frm_win         TCP window value
        sport           Source port.
        dport           Destination port.
        data_len        Length of data.
        opt_len         Length of options.
        flags           TCP flags.
        Notes:
        All values which are also contained in network packets are assumed to be in network
        order.
emt_work_array_t - Convenience type for passing around batches of emt_work_t's.
typedef struct _emt_work_array_t {
    struct _emt_work_array_t * next;
    int n_elt;
    emt_work_t work_elt[CWT_PER_EWA];
} emt_work_array_t;
        Fields:
        next                       linked list overhead.
        n_elt                      Number of emt_work_t's contained herein.
        work_elt[CWT_PER_EWA]      Array of data to be worked on.
Routine Detail
emt_init
Handles initialization for the emitter module.
void emt_init( config_info_t * ci)
        Parameters:
        ci              information read from the config file.
        Returns:
        -1              on error
        0               otherwise
emt_shutdown
Handles shutdown for the emitter module.
void emt_shutdown( )
emt_dowork
Does work for a little while, then yields.
void emt_dowork( )
```

Although the present invention has been described and illustrated in the context of testing a CDN content staging server, this is not a limitation of the present invention. One of ordinary skill in the art will recognize that systems infrastructure underlying the present invention is suitable for testing a variety of network-based systems including web servers, proxy servers, DNS name servers, web server plugins, browsers, and the like. Thus, another illustrative production environment is a web hosting environment with the system under test being any generic web server. Moreover, by adapting the test logic used to determine "equivalent output" between a production system and the SUT, real-world workloads can be used to test and validate new functionalities, regardless of the specific nature of the SUT.

Having thus described our invention, the following sets forth what we now claim.

What is claimed is:

1. A method for testing software in a production environment handling live traffic between clients and at least one production server, comprising:

connecting a system under test into the production environment;

replicating live traffic between clients and at least one production server onto the system under test while isolating the system under test from the production environment;

comparing a response from the production server with a corresponding response from the system under test to evaluate the system under test; and terminating the response from the system under test before the response reaches the production environment.

2. The method as described in claim 1 wherein the production environment is a content delivery network (CDN) and the system under test is a CDN content server.

3. The method as described in claim 2 wherein the CDN comprises a set of production servers and the system under test comprises a corresponding set of content servers.

4. The method as described in claim 1 further including the step of logging given data replicated from the live traffic.

5. The method as described in claim 1 wherein the production environment includes a switch, and the step of replicating pulls the live traffic by port scanning the switch.

6. The method as described in claim 1 wherein the step of comparing determines whether the system under test has given minimum functionality.

7. The method as described in claim 1 wherein the step of comparing determines whether the response from the production server and the corresponding response from the system under test are identical.

8. The method as described in claim 1 wherein the step of comparing determines whether the response from the production server and the corresponding response from the system under test are equivalent.

9. A method for field-testing operative in a content delivery network (CDN) handling live traffic between clients and a set of production servers organized into a region, wherein the region includes a switch and a set of content servers under test, the method comprising:
   replicating live traffic between clients and the production servers onto the set of content servers under test;
   comparing a response from a given production server with a corresponding response from a given content server under test;
   selectively logging data from the comparison; and
   terminating the response from the content server system under test before the response reaches a requesting client.

10. The method as described in claim 9 wherein the step of comparing determines whether the content server under test has given minimum functionality.

11. The method as described in claim 9 wherein the step of comparing determines whether the response from the given production server and the corresponding response from the given content server are identical.

12. The method as described in claim 9 wherein the step of comparing determines whether the response from the given production server and the corresponding response from the given content server under test are equivalent.

13. A method for field-testing operative in a request-response production environment handling live TCP-based traffic between clients and a production server, comprising:
   integrating a system under test (SUT) into the production environment;
   using the live TCP-based traffic to generate load on the system under test (SUT); and
   as a given test is carried out, terminating SUT responses intended for the clients;
   wherein the given test compares an HTTP response from the production server and the system under test (SUT).

14. The method as described in claim 13 wherein the request-responses production environment is a content delivery network (CDN) and the production server is a CDN caching appliance.

15. The method as described in claim 13 wherein the request-response production environment is a web hosting environment and the production server is a web server.

16. The method as described in claim 13 further including the step of logging TCP packets from the live TCP-based traffic as the given test is carried out.

* * * * *